United States Patent
Fukuoka et al.

(10) Patent No.: US 10,054,823 B2
(45) Date of Patent: Aug. 21, 2018

(54) LIQUID CRYSTAL DISPLAY DEVICE

(71) Applicant: Japan Display Inc., Tokyo (JP)

(72) Inventors: Nobuko Fukuoka, Tokyo (JP); Yusuke Morita, Tokyo (JP); Kazuya Daishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/375,258

(22) Filed: Dec. 12, 2016

(65) Prior Publication Data
US 2017/0176788 A1 Jun. 22, 2017

(30) Foreign Application Priority Data

Dec. 16, 2015 (JP) ................. 2015-245213

(51) Int. Cl.
*G02F 1/1339* (2006.01)
*G02F 1/1341* (2006.01)

(52) U.S. Cl.
CPC .......... *G02F 1/1339* (2013.01); *G02F 1/1341* (2013.01); *G02F 1/13394* (2013.01); *G02F 2001/13396* (2013.01); *G02F 2001/13398* (2013.01); *G02F 2001/13415* (2013.01)

(58) Field of Classification Search
CPC .. G02F 1/1339; G02F 1/13394; G02F 1/1341; G02F 2001/13396; G02F 2001/13398; G02F 2001/13415
See application file for complete search history.

(56) References Cited

U.S. PATENT DOCUMENTS

| | | | | |
|---|---|---|---|---|
| 2005/0219456 A1* | 10/2005 | Tadaki | ......... | G02F 1/1339 349/156 |
| 2013/0300961 A1* | 11/2013 | Tomikawa | ......... | G02F 1/13306 349/33 |
| 2014/0055728 A1* | 2/2014 | Oono | ......... | G02F 1/133514 349/106 |
| 2015/0346556 A1 | 12/2015 | Hirota et al. | | |
| 2016/0116772 A1* | 4/2016 | Cha | ......... | G02F 1/1339 349/123 |
| 2016/0147104 A1* | 5/2016 | Chou | ......... | G02F 1/1339 349/153 |

FOREIGN PATENT DOCUMENTS

JP H10-123537 A 5/1998

* cited by examiner

*Primary Examiner* — Nathanael R Briggs
(74) *Attorney, Agent, or Firm* — Typha IP LLC (57) ABSTRACT

A liquid crystal display includes a first substrate and a second substrate bonded to each other at their periphery by a sealant, with liquid crystal sealed between the first substrate and a second substrate, and has a display region. The first substrate is formed, between the sealant and an end portion of the display region, with a wall that partitions the liquid crystal into a portion on the display region side and a portion on the sealant side. A gap exists between the tip of the wall and the second substrate side. In the liquid crystal display device, a liquid crystal portion that has been contaminated is restrained from moving into the display region.

20 Claims, 11 Drawing Sheets

LIQUID CRYSTAL DISPLAY DEVICE

CLAIM OF PRIORITY

The present application claims priority from Japanese Patent Application JP 2015-245213 filed on Dec. 16, 2015, the content of which is hereby incorporated by reference into this application.

BACKGROUND OF THE INVENTION

1. Field of the Invention

The present disclosure relates to a display device, particularly to a liquid crystal display device provided with a countermeasure against unevenness of display which might arise from ion accumulation.

2. Description of the Related Art

In a liquid crystal display device, a TFT substrate on which pixels each having a pixel electrode and a thin film transistor (TFT) or the like are formed in a matrix pattern and a counter substrate are disposed to face each other, with liquid crystal being sandwiched between the TFT substrate and the counter substrate. The transmittance of light through liquid crystal molecules is controlled on a pixel basis, to thereby display an image.

When impurities are present in the liquid crystal, the liquid crystal is lowered in resistivity and varied in transmittance. If impurities are present partially, there arises a problem, upon displaying of an image, that the portion where the impurities are present is blackened, resulting in a display quality deterioration (black spot). While the liquid crystal display panel has the TFT substrate and the counter substrate bonded to each other by a sealant, contact of the uncured sealant with the liquid crystal results in that the sealant is partly dissolved into the liquid crystal, to be impurities in the liquid crystal.

JP-H10-123537-A discloses a configuration for preventing liquid crystal from making contact with a sealant before curing of the sealant. In the configuration, a seal part is formed in a two-layer structure, in which an elastic material is disposed on the inner side and a resin is disposed on the outer side, whereby the liquid crystal is prevented from making contact with the resin before curing of the resin. It is described that this configuration also prevents the substrates from warping at the time of bonding.

SUMMARY OF THE INVENTION

In manufacturing a liquid crystal display panel, conventionally, a method in which liquid crystal is injected into a space between a TFT substrate and a counter substrate by vacuum has been adopted. When the liquid crystal display panel becomes larger in size, however, the time taken for injection of liquid crystal becomes longer. In addition, in the case where a multiplicity of liquid crystal display panels are fabricated in a single mother substrate, the vacuum injection method is poor in efficiency. For this reason, in recent years, a method has come to be adopted in which before a TFT substrate and a counter substrate are bonded to each other, liquid crystal is dropped onto one of the substrates, to fill up the space between the substrates.

In the case of the dropping method, the liquid crystal is injected (dropped) before curing of the sealant. From the sealant yet to be cured, the material of the sealant is liable to be dissolved into the liquid crystal. Then, impurities enter into the liquid crystal, to cause a black spot or the like at the time of display.

Also in recent years, on the other hand, it has been an increasingly keen demand for enlarging the display region while reducing the overall size of the liquid crystal display panel as much as possible. Then, the so-called frame (or picture frame) should be narrower. In the case where the sealant is formed in a two-layer structure for preventing the sealant from being dissolved into the liquid crystal as in JP-H 10-123537-A, it is difficult to make the frame narrower.

An object of the present disclosure is thus, in association with the placement of liquid crystal by the dropping method, to prevent the dissolution of a sealant into the liquid crystal, while enabling a narrow frame to be realized.

To achieve the above object, the present disclosure provides the following means.

(1) In one aspect of the present disclosure, there is provided a liquid crystal display device which includes a first substrate and a second substrate bonded to each other at their peripheries by a sealant, with a liquid crystal sealed between the first substrate and the second substrate, and the liquid crystal display device having a display region, wherein the first substrate is formed, between the sealant and the end of the display region, with a wall that partitions the liquid crystal into a portion on the display region side and a portion on the sealant side, and a gap in which the liquid crystal can exist is provided between a tip of the wall and the second substrate side.

(2) In the liquid crystal display device recited in (1), in the display region, the first substrate is formed with a first spacer that defines a spacing between the first substrate and the second substrate, and the wall is formed simultaneously with the first spacer.

DESCRIPTION OF THE PREFERRED EMBODIMENTS

Figure 13:
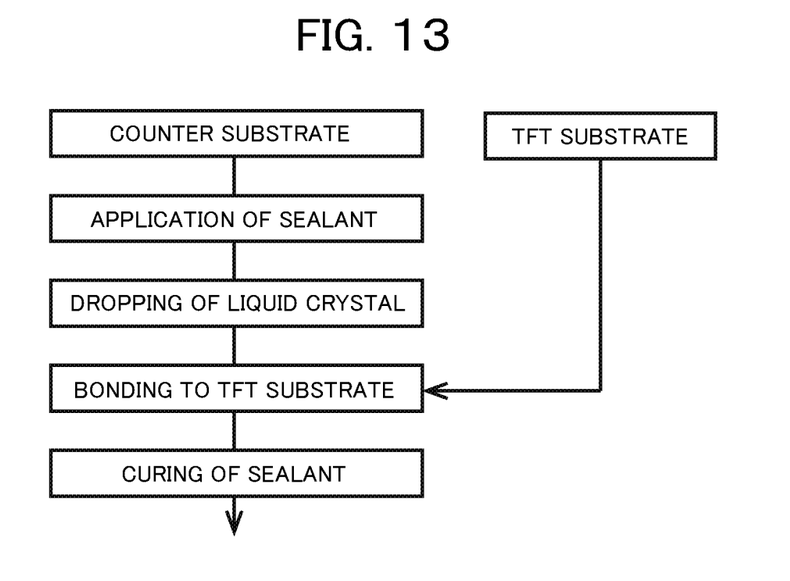
FIG. 13 is a production process chart for a liquid crystal display device.

Prior to describing specific embodiments of the present disclosure, a mechanism by which a sealant is dissolved in liquid crystal and an impurity is diffused into a display region will be described. FIG. 13 is a process chart of a process in which a liquid crystal display panel is formed by a dropping method. In manufacturing the liquid crystal display panel, a TFT substrate formed with scanning lines, video signal lines, TFTs and the like and a counter substrate formed with a black matrix or the like are produced separately, and the TFT substrate and the counter substrate are bonded to each other by a sealant.

FIG. 13 shows a process flow in the case where the sealant is formed on the counter substrate side. The sealant is formed from an organic material such as an epoxy resin, and is applied to the periphery of the counter substrate in such a manner as to surround a display region, by a dispenser or the like. Note that the sealant may be applied to the TFT substrate side in some cases. The method for applying the sealant is not limited to the use of the dispenser, and may be printing or the like.

In FIG. 13, after the sealant is applied, liquid crystal is dropped down into the display region. While the liquid crystal may be dropped on the TFT substrate side, it is a common practice to drop the liquid crystal on the side on which the sealant is formed. In this instance, the sealant, which contains various substances such as solvent, is not yet cured. When the sealant comes into contact with the liquid crystal, therefore, these substances are dissolved in the liquid crystal as impurities.

Then, the counter substrate is bonded to the TFT substrate, which has been formed separately from the counter substrate, by the sealant. Thereafter, the sealant is cured, by use of ultraviolet rays or heat or both of them, depending on the kind of the sealant. After the sealant is cured, the sealant is stable and, therefore, the impurities would not dissolve into the liquid crystal. Accordingly, it is important how to minimize the amount of impurities dissolving from the sealant into the liquid crystal by the time the sealant is cured.

Note that the counter substrate and the TFT substrate in FIG. 13 can be replaced by a mother counter substrate in which a multiplicity of counter substrates are formed, and a mother TFT substrate in which a multiplicity of TFT substrates are formed. In this case, the mother TFT substrate and the mother counter substrate are bonded to each other to form a mother substrate, and individual liquid crystal panels are separated from the mother substrate in a final step.

Figure 14:
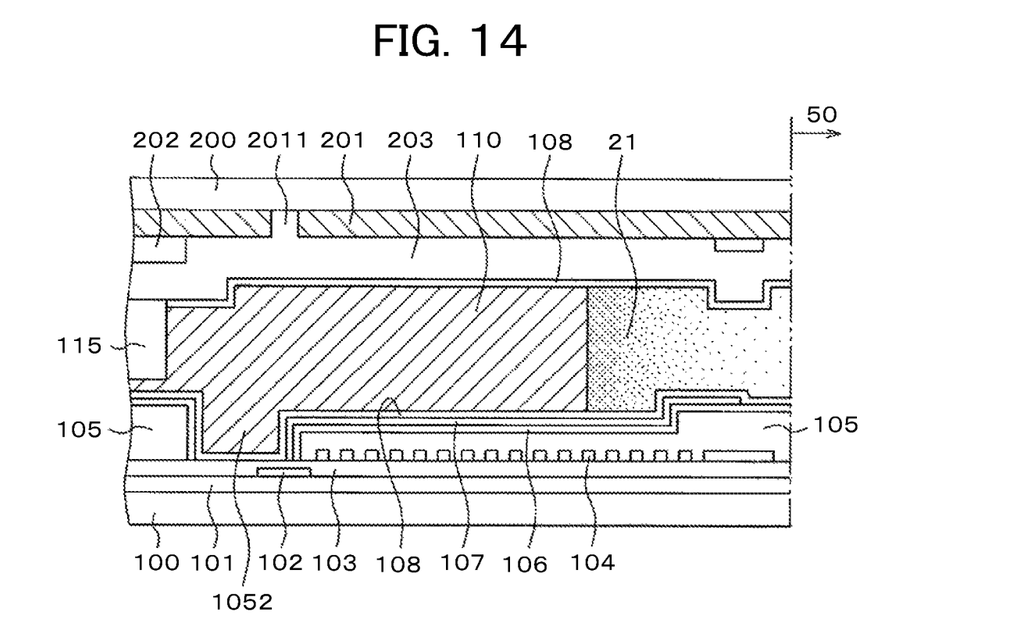
FIG. 14 is a sectional view of a seal portion of a liquid crystal display device in the case where the present disclosure is not applied.

FIG. 14 is a sectional view showing a state of a seal portion in the case where the present disclosure is not applied. Specifically, FIG. 14 is a sectional view of the seal portion in a state in which a TFT substrate 100 and a counter substrate 200 are bonded to each other. In FIG. 14, liquid crystal 21 is in contact with a sealant 110. Of the liquid crystal in FIG. 14, a state in which impurities are dissolved from the sealant into the liquid crystal is indicated by halftone.

Specifically, FIG. 14 shows a state in which large amounts of impurities are present in the liquid crystal 21 in contact with the sealant, and the concentration of the impurities decreases in approaching the side of a display region 50. If the impurities are present outside the display region, there arises no problem as to display of an image. When the impurities move into the display region 50, however, a black spot is generated in this area, deteriorating the quality of display.

The present disclosure proposes a reduction of influences of impurities, such as the black spot, in the display region 50, by reducing the amount of impurities dissolved into the liquid crystal and by making it difficult for the impurities dissolved in the liquid crystal to diffuse into the display region. Note that details of a sectional structure at the seal portion will be described later referring to FIG. 2. The present disclosure will be described more in detail below by showing Embodiments.

<First Embodiment>

Figure 1:
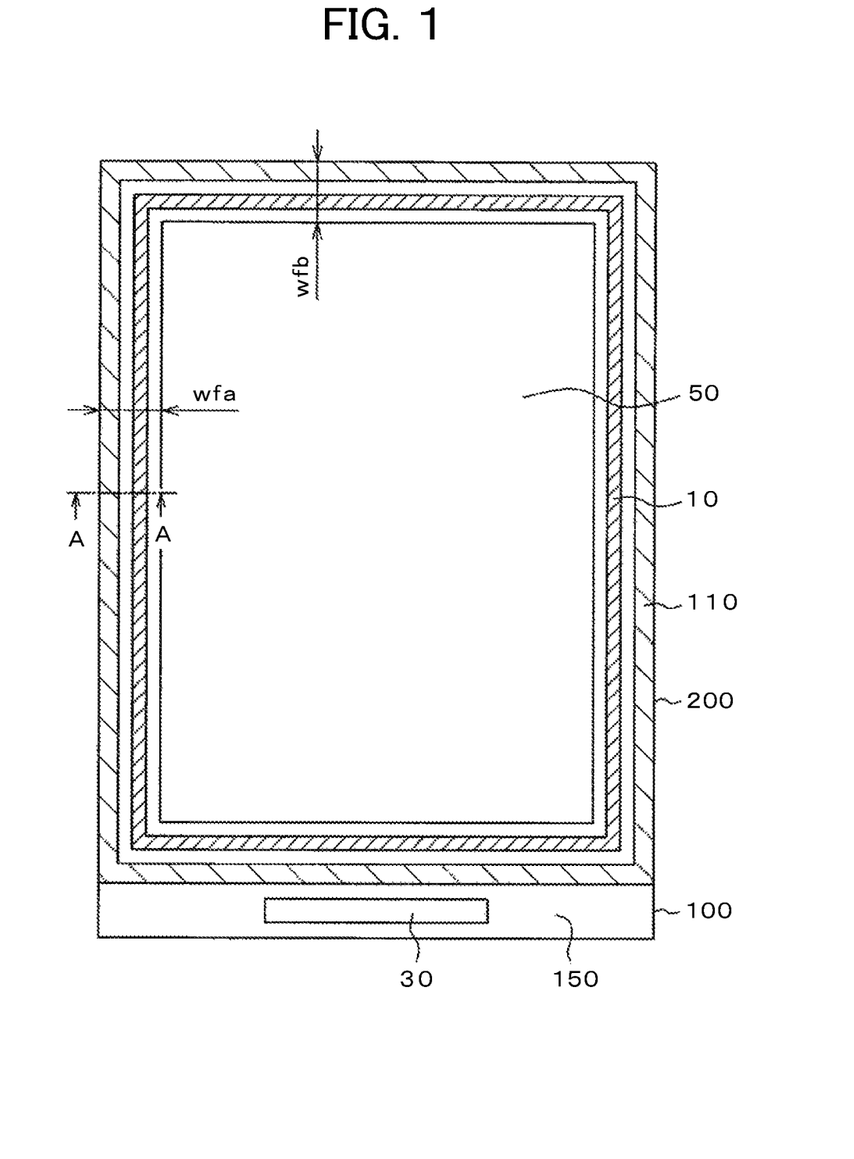
FIG. 1 is a plan view showing an example of a liquid crystal display device to which the present disclosure is applied.

FIG. 1 is a plan view of a liquid crystal display panel for use in mobile phones or the like, as an example of application of the present disclosure. In FIG. 1, a TFT substrate 100 and a counter substrate 200 are bonded to each other at their periphery by a sealant 110, and liquid crystal is held between the TFT substrate 100 and the counter substrate 200. The TFT substrate 100 is formed to be larger than the counter substrate 200, and a portion where the TFT substrate 100 is present singly is a terminal portion 150. A driver IC 30 is disposed in the terminal portion 150, and a flexible wiring substrate for supplying power and signals to the liquid crystal display panel from outside is connected to the terminal portion 150.

In FIG. 1, between the display region 50 and the sealant 110, a restraint wall (hereinafter referred to simply as wall 10) for restraining a flowing motion of the liquid crystal is formed such as to surround the display region 50. Although the liquid crystal is placed to fill up an area ranging to an inside end portion of the sealant 110, the movement of the liquid crystal is different between the outside and the inside of the wall 10. The width of a frame, namely, the width from an end portion of the display region to an outside end of the liquid display panel, is small. In addition, in many cases, the width of the frame on the side of a long side differs from the width of the frame on the side of a short side. For example, the width wfa of the frame at the long side is 0.5 mm, while the width wfb of the frame at the short side is 0.9 mm.

Figure 2:
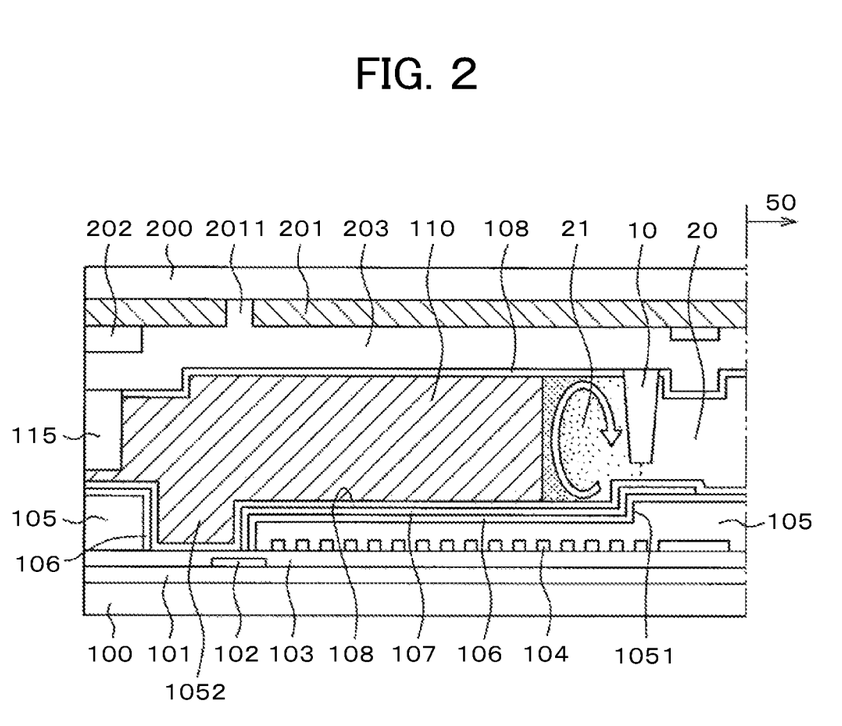
FIG. 2 is a sectional view of a seal portion of the liquid crystal display device in the present disclosure.

FIG. 2 is a sectional view taken along line A-A of FIG. 1. In the display region 50 in FIG. 2, pixels typically in a so-called IPS system or in other system are provided. The IPS system is characterized in that pixel electrodes and a common electrode are formed on the side of the TFT substrate. Specifically, a signal voltage is impressed between a first electrode composed of a transparent electrode of indium tin oxide (ITO) or the like formed in a planar shape and a second electrode composed of a transparent electrode of ITO or the like, with a capacitive insulation film being sandwiched between the first electrode and the second electrode, whereby liquid crystal molecules are rotated and transmittance is controlled on a pixel basis, to form an image. The first electrode may be the pixel electrode, or may be the common electrode. In addition, the second electrode may be the pixel electrode, or may be the common electrode.

In FIG. 2, the TFT substrate 100 is formed with a gate insulation film 101, and gate electrodes, scanning lines, or a light blocking film 102 formed of the same layer as that of the gate electrodes is formed thereover. The light blocking film has a function of blocking the light from a backlight, in the area of a black matrix groove 2011 which will be described later. In addition, an inter-layer insulation film 103 is formed over the light blocking film 102 and the gate insulation film 101. Lead wires 104 which are formed of the same layer as the video signal lines and which are for connecting the video signal lines and the like to the driver IC disposed at the terminal portion are formed over the inter-layer insulation film 103.

An organic passivation film 105 is formed covering the lead wires 104. Since the organic passivation film 105 is designed to function also as a planarizing film, it is formed to have a large thickness of 2 to 3 μm. In order to prevent penetration of moisture from the outside into the display region through the organic passivation film 105, an organic passivation film groove 1052 is provided, thereby preventing the penetration of moisture through the organic passivation film 105. In addition, the organic passivation film 105 is formed with a stepped portion 1051 of organic passivation film on the display region 50 side as compared to the sealant 110. The thickness of the organic passivation film 105 on the display region 50 side is, for example, 3 μm, whereas the thickness of the organic passivation film 105 on the sealant 110 side of the stepped portion 1051 is, for example, 2 μm. Since the thickness of the organic passivation film 105 on the sealant 110 side is thus reduced, the sealant 110 can be formed in a larger amount accordingly, so that the reliability of adhesion can be enhanced.

The first electrode composed of ITO is formed on the organic passivation film 105 in the display region 50; at the seal portion in FIG. 2, however, the first electrode is not present on the organic passivation film 105. In FIG. 2, a capacitive insulation film 106 for insulation between the first electrode and the second electrode is formed on the organic passivation film 105 in the display region 50. Since the capacitive insulation film 106 in the display region 50 forms a pixel capacitance between the pixel electrode and the common electrode, it is called the capacitive insulation film. An ITO film 107 is formed on the capacitive insulation film 106. The ITO film 107 is formed simultaneously with the formation of the second electrode which is formed of ITO in the display region 50. Since the capacitive insulation film 106 and an alignment film 108 are poor in adhesion to each other, the reliability of adhesion is enhanced by the ITO film 107. The alignment film 108 is formed covering the ITO film 107 and the capacitive insulation film 106. The alignment film 108 is for defining the direction of initial alignment of the liquid crystal molecules in the display region 50.

In FIG. 2, the TFT substrate 100 and the counter substrate 200 are disposed to face each other, with the sealant 110 therebetween. A black matrix 201 is formed on the counter substrate 200. In the display region 50, the black matrix 201 is formed between color filters to enhance contrast on the screen. At the seal portion in FIG. 2, the black matrix 201 has a function as a light blocking film. Since the black matrix 201 is formed from organic matter, a black matrix groove 2011 is formed for the purpose of preventing penetration of moisture through the black matrix 201 from the outside. In order to prevent leakage of light from a backlight through the black matrix groove 2011, a light blocking film 102 formed simultaneously with the gate electrodes is disposed on the side of the TFT substrate 100.

In FIG. 2, a color filter 202 is formed at an end portion on the side of the counter substrate 200. Although the color filter 202 is for forming a color image in the display region 50, it is used, at the seal portion in FIG. 2, as a base for a spacer 115. An overcoat film 203 is formed covering the black matrix 201 and the color filter 202. On the overcoat film 203 is formed the wall 10 for restraining a flowing motion of the liquid crystal, which is a characteristic of the present disclosure. While the spacer for defining the spacing between the TFT substrate 100 and the counter substrate 200 is formed in the display region 50, the wall 10 in FIG. 2 is formed simultaneously with, and from the same material as that of, the spacer. The wall 10 is formed surrounding the display region, as shown in FIG. 1.

The liquid crystal 21 present on the sealant 110 side of the wall 10 is contaminated with components of the sealant 110 before curing. The degree of contamination is the highest at the liquid crystal portion in contact with the sealant 110, and decreases in going toward the wall 10 side. On the display region side of the wall 10, the liquid crystal is little contaminated. In other words, the contaminated liquid crystal 21 only undergoes convection between the sealant 110 and the wall 10 as indicated by an arrow in FIG. 2, and does not come out to the display region 50 side. Therefore, in the display region 50, it is possible to restrain a black spot from being generated due to contaminants in the liquid crystal.

In order to confine the contaminated liquid crystal 21 to the sealant 110 side of the wall 10, the height of the wall is important. In FIG. 2, the thickness of the liquid crystal layer in the display region 50 is, for example, 3 μm. In this case, the spacing between the wall 10 and the alignment film 108 on the TFT substrate 100 side is, for example, 0.5 to 0.7 μm. If this spacing is too large, it is impossible to confine the contaminated liquid crystal between the wall 10 and the sealant 110. For this reason, it is necessary to set the spacing to be not more than 30% of the layer thickness of the liquid crystal in the display region 50. If the spacing is too small, on the other hand, there arises a problem that at the time of bonding the TFT substrate and the counter substrate to each other, the liquid crystal would not go into the region on the sealant 110 side or it takes long time for the liquid crystal to fill this region. For this reason, it is necessary to set the spacing to be not less than 0.1 μm.

Note that while the wall 10 is formed simultaneously with the spacer in the display region 50, the adjustment of the height of the wall 10 may be carried out using half exposure; alternatively, the wall 10 may be set to be equal in height to the spacer in the display region 50, without using half exposure. Specifically, in the case where the color filter 202 is present as a base for columnar spacers in the display region 50, if the color filter 202 is not present as a base for the wall 10, the height of the wall 10 can be made smaller than the height of the spacers in the display region 50 by the value of the thickness of the color filter 202.

In addition, the spacers in the display region 50 include main spacers normally making contact with the substrate faced by the spacers, and sub spacers coming into contact with the substrate when a pressure is externally exerted on the liquid crystal display panel. When the height of the wall 10 in the present disclosure is set to be equal to the height of either the main spacers or the sub spacers in the display region 50, the adjustment of the height of the wall 10 can be performed without using any new half exposure condition.

Note that individual liquid crystal display panels are separated from the mother substrate along scribing lines, after the mother substrate is completed. A spacer 115 for scribing is formed on the counter substrate 200 side of an outside end portion of the sealant 10 in FIG. 2. This spacer 115 is formed in a bank-like shape along the scribing line. The bank-like spacer 115 is also formed simultaneously with the spacers in the display region 50. In addition, the organic passivation film 105 is formed in a thickness of 3 μm at an end portion on the TFT substrate 100 side. Therefore, at the scribing portion which is a substrate end portion, there is little sealant 110. At the time of separating the individual liquid crystal display panels, if the sealant 110 is present on the scribing line, the fracture line formed in breaking after the scribing would be irregular. However, if the configuration as illustrated in FIG. 2 is adopted, the fracture surface can be made regular in shape.

Figure 3:
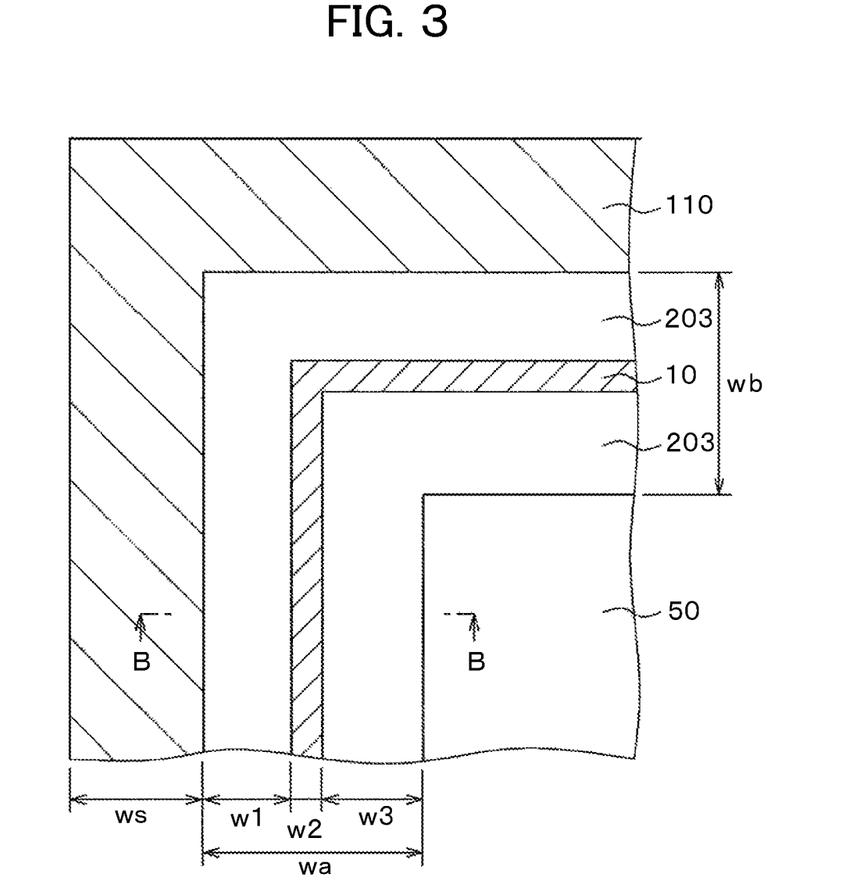
FIG. 3 is an enlarged plan view of FIG. 1.
Figure 4:
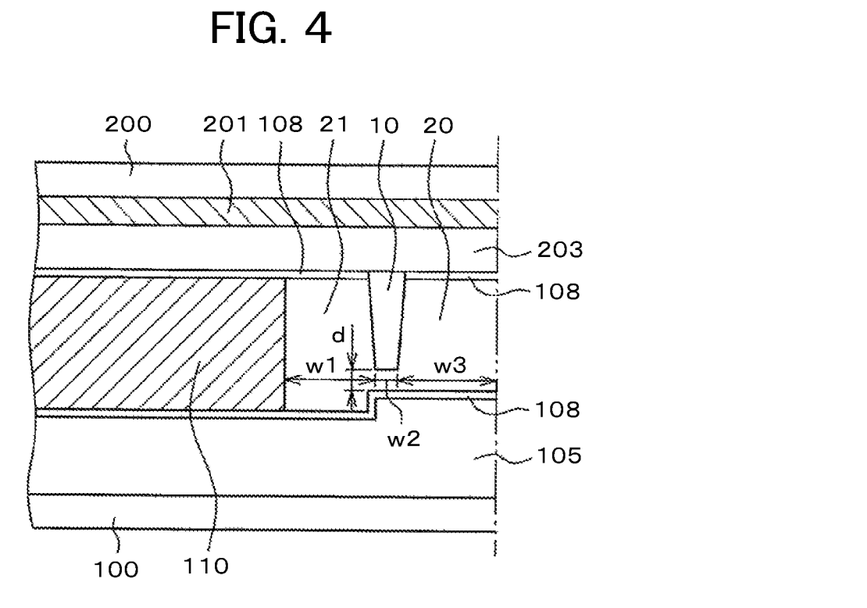
FIG. 4 is a schematic sectional view of a seal portion of the liquid crystal display device in the present disclosure.
Figure 5:
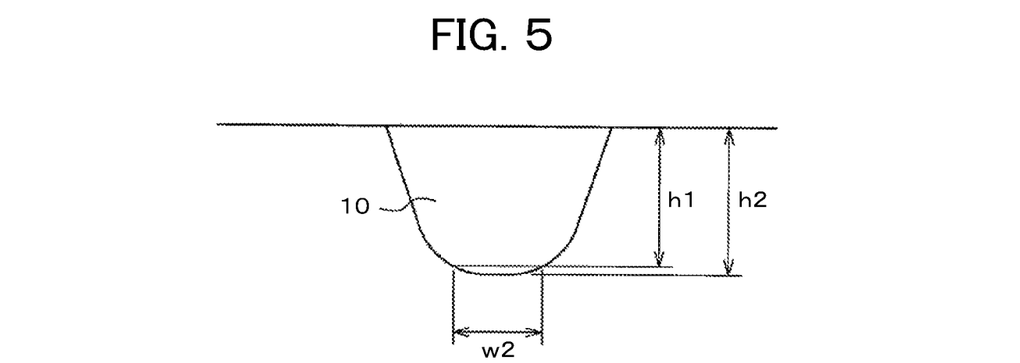
FIG. 5 is a sectional view in a width direction of a wall.

FIG. 3 is an enlarged plan view of a part of FIG. 1. In FIG. 3, the wall 10 for restraining a flowing motion of the liquid crystal is formed surrounding the display region 50. FIG. 3 is a plan view in which the counter substrate 200 is viewed from the TFT substrate 100 side. In FIG. 3, the width from an end portion of the sealant 110 to the wall 10 is w1, the width of the wall 10 is w2, and the distance from the wall 10 to the display region 50 is w3. As depicted in FIG. 4, w1, w2 and w3 are measured at an upper portion of the wall 10. Note that the upper portion of the wall 10 means a portion of a height h1 satisfying h1=0.95×h2, where h2 is the maximum height of the wall 10, as shown in FIG. 5. In this case, the width of the wall 10 is w2, as shown in FIG. 5. Note that FIG. 5 is a sectional view in the width direction of the wall 10. In addition, FIG. 4 is a sectional view of the liquid crystal display panel, taken along line B-B of FIG. 3. Note that in the case where the wall 10 is formed integrally with the overcoat film 203, the height of the wall 10 means the height from a planar surface of the overcoat film 203.

If w1 in FIGS. 3 and 4 is small, a space for holding the contaminated liquid crystal is not sufficiently large, so that the probability for the contaminated liquid crystal to flow toward the display region side would be high. For this reason, it is preferable to ensure that w1 is not less than 50 µm. Typically, w1 is about 80 µm. On the other hand, if the distance w3 from the display region 50 to the end portion of the wall 10 is small, there would arise a problem that, for example, the time taken for the contaminated liquid crystal 21 coming out beyond the wall 10 to reach the display region 50 is shortened, or the amount of the contaminated liquid 21 that reaches the display region 50 is enlarged. In view of this, it is preferable to ensure that the distance w3 is not less than 40 µm. Typically, w3 is about 50 µm.

Besides, the width w2 of the wall 10 is automatically determined when the widths of the frame and the sealant 110 are determined and required values for w1 and w3 are determined. From the viewpoint of mechanical strength, however, it is preferable to ensure that the width w2 is not less than 6 µm. Typically, w2 is 15 µm. Note that the spacing d between the tip of the wall 10 and the alignment film 108 on the TFT substrate 100 side is in the range from 0.1 µm to ⅓ times the layer thickness of the liquid crystal 20 in the display region, as has been described above.

The role of the wall 10 of restraining a flowing motion of the liquid crystal not only has the role of inhibiting the contaminated liquid crystal from moving to the display region side but also has an effect of shortening the time for which the liquid crystal upon being dropped makes contact with the uncured sealant 110, and thus shortening the time for which dissolution of the components of the uncured sealant 110 into the liquid crystal takes place, thereby to reduce the absolute amount of the impurities in the liquid crystal.

Specifically, after the dropping of the liquid crystal, the substrate (e.g., the counter substrate) onto which the liquid crystal has been dropped and the other substrate (e.g., the TFT substrate) are mated to each other. In this instance, the presence of the wall 10 ensures that the dropped liquid crystal first spreads within the display region 50, to fill up the display region 50, and then moves beyond the wall 10 to reach the uncured sealant 110. Immediately thereafter, the curing of the sealant by use of ultraviolet rays or the like is conducted. In other words, with the wall 10 present, the time for which the liquid crystal makes contact with the uncured sealant 110 can be minimized, and, accordingly, the amount of the components of the uncured sealant 110 that are dissolved into the liquid crystal can be reduced.

In FIG. 3, the width ws of the sealant 110 is not more than 0.4 mm, in the case of a narrow frame. In FIG. 3, the distance from an outside end portion of the display region 50 to an inside end portion of the sealant 110, in many cases, differs on a side basis. In general, the distance from an outside end portion of the display region 50 to an inside end portion of the sealant 110 is greater at a short side than at a long side; for example, the distance wa from the outside end portion of the display region 50 to the inside end portion of the sealant 110 at a long side is 143 µm, whereas the distance wb from the outside end portion of the display region 50 to the inside end portion of the sealant 110 at a short side is 153 µm. In addition, the value of the distance wb at the short side is greater on the terminal portion 150 side than on the opposite side of the terminal portion 150 side.

Figure 6:
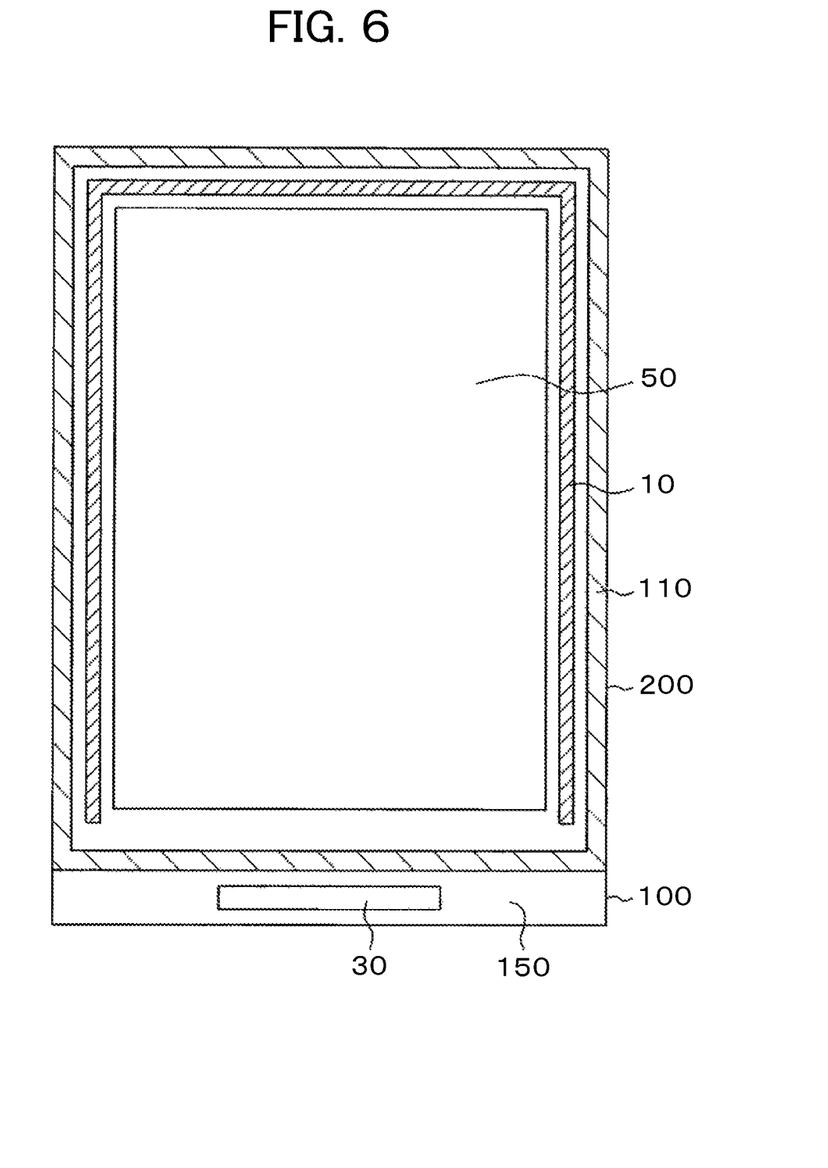
FIG. 6 is a plan view showing another mode of the present disclosure.

The wall 10 for restraining a flowing motion of the contaminated liquid crystal in the present disclosure is particularly effective in the case where the distance from the display region 50 to the inside end of the sealant 110 is small. Of the four sides of the liquid crystal display panel, the one at which this distance is the largest is the side on the terminal portion 150 side. For this reason, even in the case where the wall 10 is not formed at the side on the terminal portion 150 side but is formed only at the other three sides, the effect of the present disclosure can be obtained. FIG. 6 is a plan view of a liquid crystal display panel, showing such a configuration. FIG. 6 is the same as FIG. 1 except that the wall 10 is not formed at the short side on the terminal portion 150 side, and, therefore, description thereof is omitted here. Further, in general, the distance from the display region to the inside end of the sealant is shorter on the side of a long side than on the side of a short side. Accordingly, even where the wall 10 is not formed on the sides of short sides but is formed only on the sides of long sides, the effect of the present disclosure can be obtained.

Figure 7:
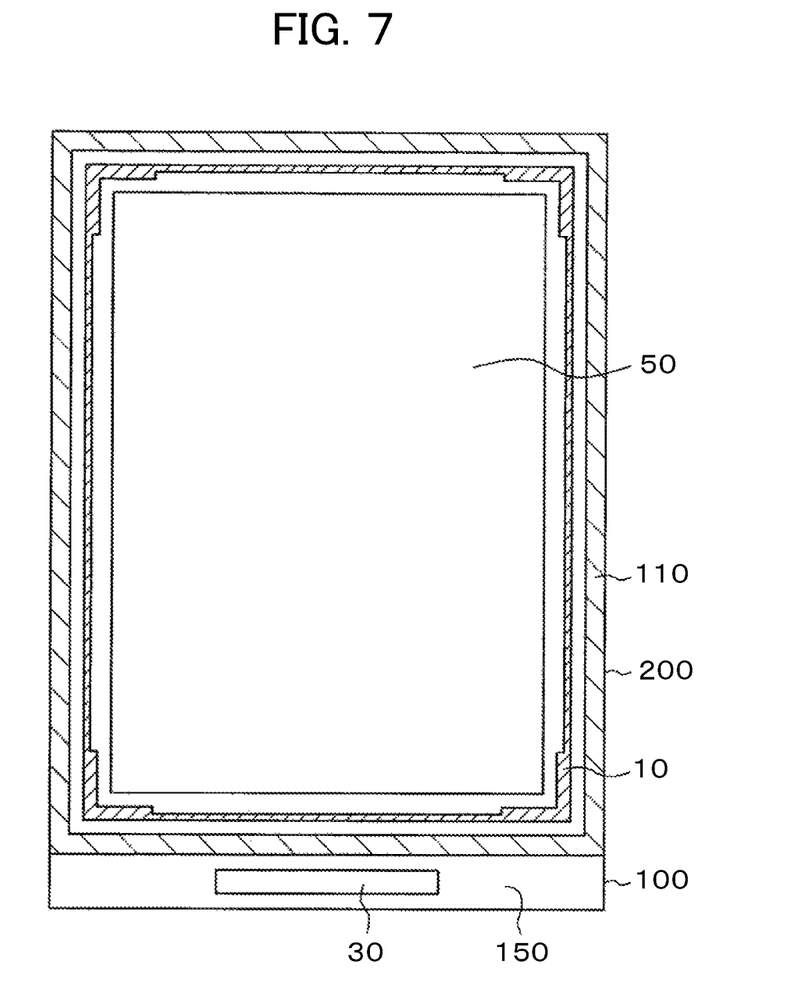
FIG. 7 is a plan view showing a further mode of the present disclosure.

When the sealant 110 is applied by a dispenser, the thickness of the sealant 110 applied is greater at the four corners. Then, the distance between the end portion of the sealant 110 and the end portion of the display region 50 is smaller at the corner portions than at the other portions. On the other hand, as the width of the wall 10 for restraining a flowing motion of the contaminated liquid crystal is greater, the effect of the wall 10 is higher. Therefore, in a liquid crystal display panel having such specifications that the sealant 110 is thicker at the corners, a higher effect may be obtained by setting the width of the wall 10 to be greater at the corners. FIG. 7 is a plan view of a liquid crystal display panel, showing such a configuration. In FIG. 7, the width of the wall 10 is greater at the corner portions than at the side portions. In other points of configuration, FIG. 7 is the same as FIG. 1.

Figure 8:
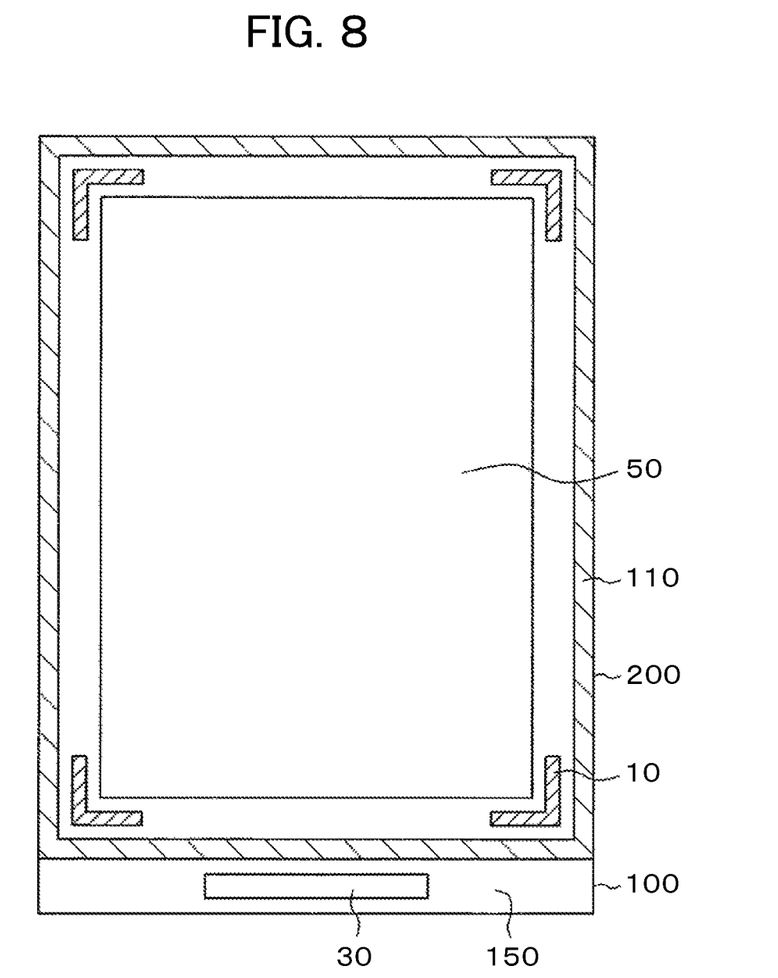
FIG. 8 is a plan view showing still another mode of the present disclosure.

FIG. 8 shows another example of the present disclosure. In the corner portions, the sealant 110 tends to be closer to the display region 50 than in the other areas. Therefore, the influence of dissolution of the components of the uncured sealant 110 into the liquid crystal is greater at the corner portions than at the other portions. In FIG. 8, the wall 10 is formed only at the corner portions, and this configuration permits the effect of the present disclosure to be produced efficiently.

Figure 9:
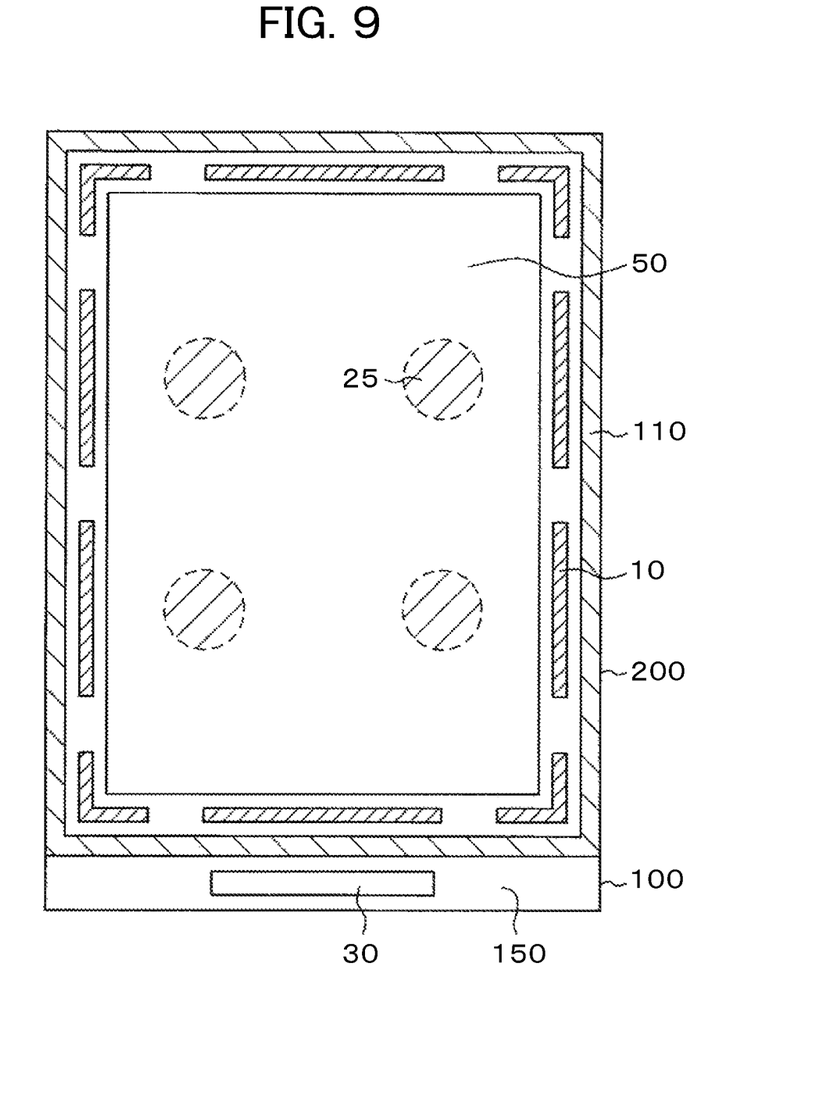
FIG. 9 is a plan view showing a still further mode of the present disclosure.

FIG. 9 shows a further example of the present disclosure. Since the liquid crystal upon being dropped onto the substrate spreads radially on the substrate, the liquid crystal reaches earlier the sealant 110 located nearer to the position at which the liquid crystal is dropped. As a result, the time for which the uncured sealant 110 and the liquid crystal are in contact with each other is longer in this area. FIG. 9 shows a configuration for restraining this phenomenon, wherein the wall 10 is formed at portions near the positions at which the liquid crystal can be dropped. By this configuration, the time for which the liquid crystal makes contact with the uncured sealant 110 can be shortened, and, on the whole, the amount of the components of the uncured sealant 110 that are dissolved into the liquid crystal can be reduced.

Figure 10:
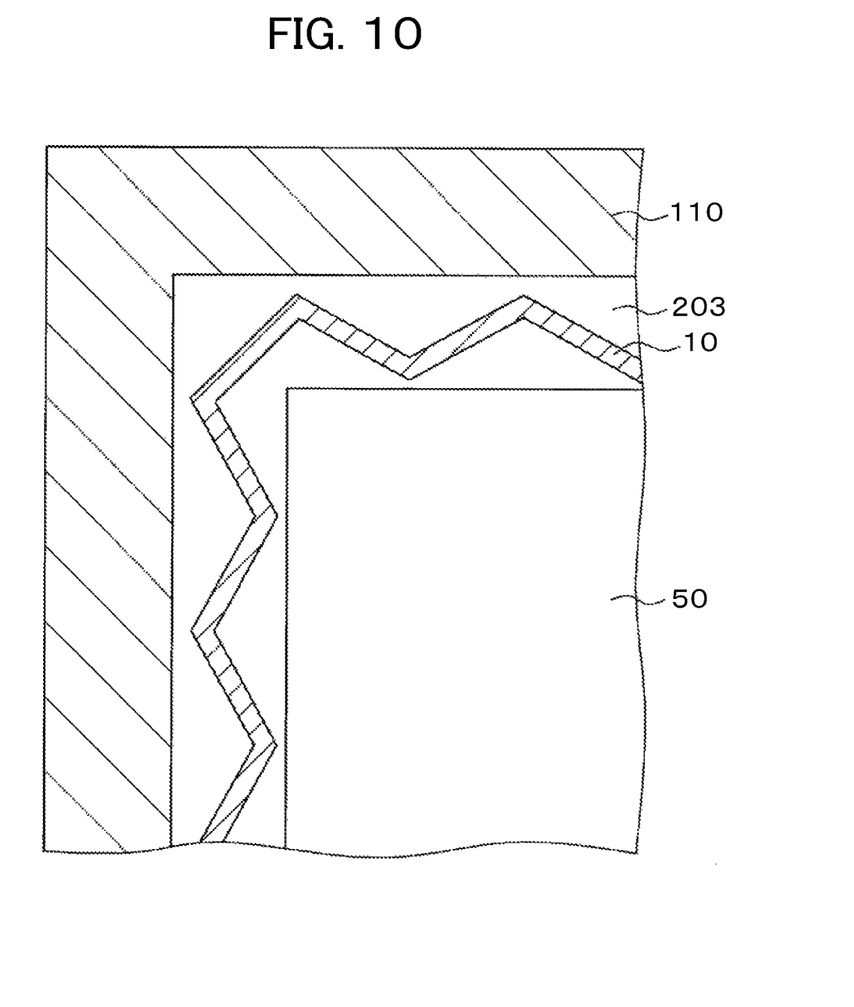
FIG. 10 is a plan view showing yet another mode of the present disclosure.

Described above are examples in which the wall 10 is formed rectilinearly along the sides of the liquid crystal display panel. However, the wall 10 in the present disclosure is not limited to the rectilinear shape. For example, the wall 10 may be formed zigzag, as depicted in FIG. 10. In FIG. 10, at each of the corners, the wall 10 is not bent at 90 degrees, but is formed in a short-cut shape in the manner of short-circuiting the corner. Setting the wall 10 in such a shape ensures that the width w1 between the sealant 110 and the wall 10 can be more easily secured at the corners limited in space. Note that the shape of the wall 10 is not limited to the shape depicted in FIG. 10, and may be formed in other shapes.

<Second Embodiment>

Figure 11:
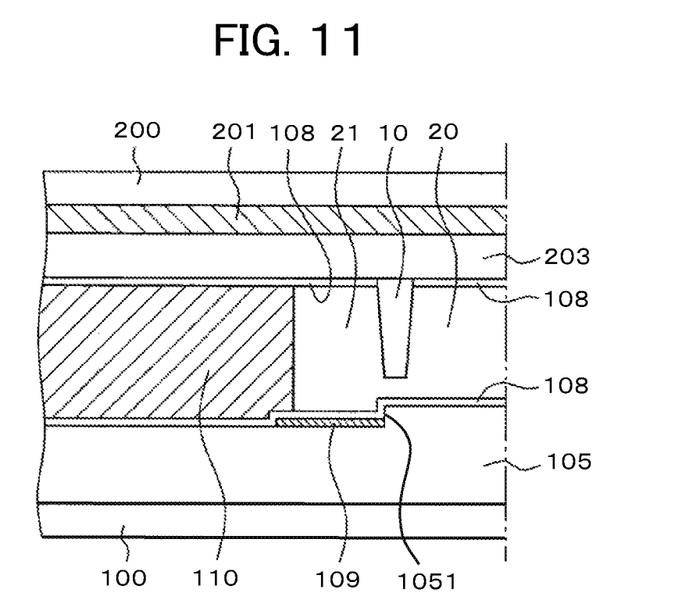
FIG. 11 is a sectional view of a second embodiment.

FIG. 11 is a sectional view of a seal portion, showing another embodiment of the present disclosure. Many of the impurities dissolved from the uncured sealant 110 into the liquid crystal are in an ionized state. FIG. 11 shows an example wherein an electrode 109 for ion trapping is formed between the wall 10 that restrains the contaminated liquid crystals 21 from moving to the side of the display region 50, and the sealant 110. The trapping electrode 109 can, for example, be formed from ITO simultaneously with the formation of the second electrode in the display region, like the ITO film 107 in FIG. 2. In other points of configuration, FIG. 11 is the same as FIG. 4.

The ions dissolved in the liquid crystal are plus ions in many cases. In such a case, when a negative voltage is impressed on the trapping electrode 109, the plus ions can be confined into the area on the sealant 110 side of the wall 10. Note that the negative voltage here means a voltage which is negative as compared to the common electrode; for example, the same potential as the potential of a scanning signal in an OFF state can be impressed.

Note that by impressing a negative voltage on the ITO film in FIG. 2, also, an effect as a trapping electrode can be produced.

<Third Embodiment>

Figure 12:
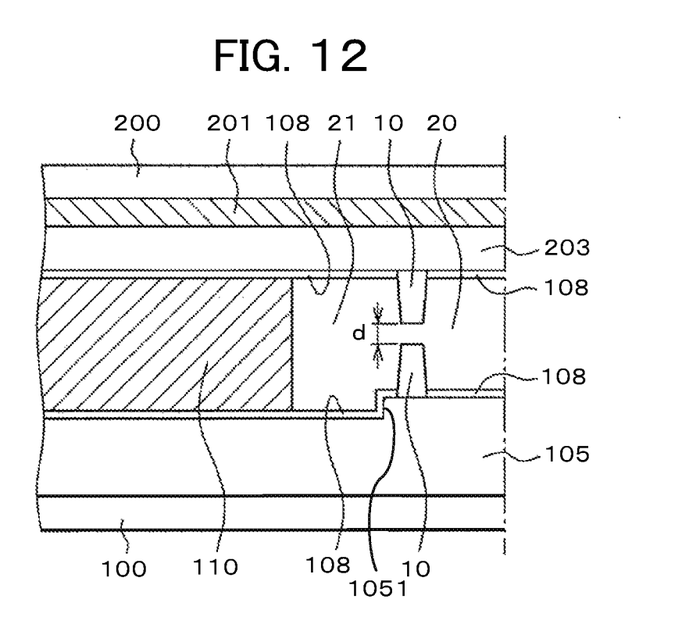
FIG. 12 is a sectional view of a third embodiment.

FIG. 12 is a sectional view of a seal portion, showing a further embodiment of the present disclosure. The wall 10 for restraining a flowing motion of the liquid crystal in the First and Second Embodiments is formed in the same step as the step of forming the spacers for defining the spacing between the TFT substrate 100 and the counter substrate 200 in the display region. Meanwhile, the spacing between the TFT substrate 100 and the second substrate 200 can be defined by forming the spacers on both of the substrates, instead of forming the spacers on only one of the substrates. In this case, the allowance for the spacers on one side and the spacers on the other side to face each other is increased by a configuration wherein the spacers are rectangular in plan-view shape, and the major axes of the spacers on the substrate on one side are set to intersect the major axes of the spacers on the substrate on the other side at a predetermined angle. Such a configuration is called cross spacers.

FIG. 12 shows an example wherein the wall is formed both on the TFT substrate 100 side and on the counter substrate 200 side, correspondingly to the just-mentioned configuration of the display region. In the case of the configuration depicted in FIG. 12, also, it is favorable to ensure that the spacing "d" between the upper-side wall 10 and the lower-side wall 10 facing each other is at least 0.1 μm and is not more than ⅓ times the layer thickness of the liquid crystal in the display region, like in the case of the First Embodiment described above. In other points of configuration, FIG. 12 is the same as FIG. 4.

In the First and Second Embodiments above, the wall 10 has been described to be formed on the counter substrate 200. In the case where the spacers in the display region 50 are formed on the TFT substrate 100 side, however, the wall 10 can be formed on the TFT substrate 100 side. In addition, the organic passivation film 105 of the TFT substrate can also be formed of the color filter. Besides, a configuration may be adopted wherein organic films such as the organic passivation film and the color filter are not provided on the TFT substrate. Note that although the stepped portion 1051 of the organic film 105 is located between the wall 10 and the sealant 110, the stepped portion 1051 may be located between the wall 10 and the display region 50. In addition, while a method wherein the height of the wall 10 itself is controlled and a configuration wherein the color filter is provided between the wall 10 and the counter substrate 200 have been disclosed herein for controlling the distance from the wall 10 to the TFT substrate, a flowing motion of the liquid crystal may also be controlled by providing a recessed portion in the organic film 105 provided on the substrate that faces the wall 10. Further, a flowing motion of the liquid crystal can also be controlled by providing the stepped portion 1051 of the organic film 105 between the wall 10 and the display region 50 and controlling the distance between the wall 10 and the stepped portion 1051. In addition, while an explanation on the assumption of a liquid crystal in the IPS system has been made above, the present disclosure is not limited to the IPS system, but is applicable to liquid crystal display devices of other systems such as Twisted Nematic (TN) or Vertical Alignment (VA), etc.

What is claimed is:

1. A liquid crystal display device comprising a counter substrate and a TFT substrate bonded to each other by a sealant, with a liquid crystal sealed between the counter substrate and the TFT substrate, the liquid crystal display device having a display region, wherein the counter substrate includes a first color filter formed at an end portion of the counter substrate, and a second color filter formed inner side from the end of the counter substrate and apart from the first color filter, wherein an overcoat film formed over the first color filter and the second color filter, the overcoat film has a first projection over the first color filter and a second projection over the second color filter, wherein a wall is formed between the sealant and the second projection, wherein the TFT substrate includes an organic passivation film which has a first portion, a second portion and a stepped portion, a thickness of the second portion is smaller than a thickness of the first portion, the thickness of the second portion is greater than zero μm, and the stepped portion is formed between the first portion and the second portion, wherein the liquid crystal is provided between the wall and the TFT substrate, and wherein a part of the wall faces to the stepped portion.

2. The liquid crystal display device according to claim 1, wherein the counter substrate includes a main spacer that contacts the TFT substrate to define a spacing between the counter substrate and the TFT substrate in the display region, the wall is formed from the same material of the main spacer, and the wall does not contact the TFT substrate.

3. The liquid crystal display device according to claim 2, wherein the wall is equal to the main spacer in height.

4. The liquid crystal display device according to claim 2, wherein a sub spacer smaller than the main spacer in height is formed in the display region, the wall is formed simultaneously with the second spacer, and the wall is equal to the second spacer in height.

5. The liquid crystal display device according to claim 1, wherein in a section in a width direction of the wall, an upper portion of the wall is defined by a region where a height is at 95% of the highest part of the wall, and then a spacing between an inside end portion of the sealant and an outside end portion of the upper portion of the wall is at least 50 µm, and the upper portion faces to the stepped portion.

6. The liquid crystal display device according to claim 5, wherein a spacing between an inside end portion of the upper portion of the wall and an end portion of the display region is at least 40 µm.

7. The liquid crystal display device according to claim 6, wherein a width of the wall at the upper portion is at least 6 µm.

8. The liquid crystal display device according to claim 7, wherein a spacing between a tip of the wall and an alignment film formed on the TFT substrate is at least 0.1 µm and is not more than ⅓ times a layer thickness of the liquid crystal in the display region.

9. The liquid crystal display device according to claim 8, wherein the wall surrounds an entire periphery of the display region.

10. The liquid crystal display device according to claim 9, wherein the wall has an extending direction and a width direction, the wall has corner portions corresponding to corner portions of the display region, the corner portions of the wall having width greater than other portions of the wall in the width direction.

11. The liquid crystal display device according to claim 8, wherein the wall is divided into a plurality of wall portions, a space exists between two adjacent wall portions of the plurality of wall portions, the plurality of wall portions are arranged in such a manner as to surround the display region.

12. The liquid crystal display device according to claim 8, wherein the wall is formed only at portions corresponding to corner portions of the display region.

13. The liquid crystal display device according to claim 8, wherein the TFT substrate has a portion not facing the counter substrate, the portion is formed with a terminal portion, and the wall is not formed at a side adjacent to the terminal portion.

14. The liquid crystal display device according to claim 13, wherein the wall is not formed at a side opposite to the terminal portion.

15. The liquid crystal display device according to claim 1, wherein the TFT substrate further includes a capacitive insulation film that covers the first portion and the second portion of the organic passivation film, an electrode for ion trapping is formed on the capacitive insulation film, and an alignment film covers the electrode, wherein the electrode is formed between the wall and the sealant.

16. The liquid crystal display device according to claim 15, wherein a voltage lower than a common voltage is applied to the electrode for ion trapping.

17. The liquid crystal display device according to claim 16, wherein the counter substrate further includes a black matrix, which is covered by the overcoat film, the TFT substrate further includes a light blocking film, the black matrix has a first groove between the first color filter and the wall in a plan view, and the first groove overlaps the light blocking film in a plan view.

18. The liquid crystal display device according to claim 17, wherein the TFT substrate further includes an inter-layer insulation film, a second groove is formed in the organic passivation, the organic passivation film is arranged between the inter-layer insulation film and the capacitive insulation film, the second groove exposes the inter-layer insulation film, the second portion of the organic passivation film is between the second groove and the first portion, a first end of the light blocking film overlaps with the second portion, and a second end of the light blocking film overlaps with the second groove in a plan view.

19. The liquid crystal display device according to claim 18, wherein the light blocking film is covered by the inter-layer insulation film, a width of the first groove is smaller than a width of the light blocking film in a same width direction.

20. The liquid crystal display device according to claim 16, wherein a degree of contamination of the liquid crystal by impurities from material of the sealant between the sealant and the wall is higher than a degree of contamination of the liquid crystal from material of the sealant between the wall and the display region.

\* \* \* \* \*